(12) United States Patent
Shum et al.

(10) Patent No.: US 8,206,219 B2
(45) Date of Patent: Jun. 26, 2012

(54) INTERACTIVE GAMING APPAREL FOR INTERACTIVE GAMING

(75) Inventors: Albert Shum, Portland, OR (US); Thomas Foxen, Portland, OR (US); James Meschter, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 1963 days.

(21) Appl. No.: 10/286,396

(22) Filed: Oct. 30, 2002

(65) Prior Publication Data

US 2004/0087366 A1 May 6, 2004

(51) Int. Cl.
*A63F 9/24* (2006.01)
*A63F 13/00* (2006.01)

(52) U.S. Cl. .......... 463/36; 463/1; 463/37; 463/43; 463/47

(58) Field of Classification Search .......... 463/1, 42, 463/47, 5, 33, 35, 36–37, 43; 273/459, 460, 273/461; 434/1
See application file for complete search history.

(56) References Cited

U.S. PATENT DOCUMENTS

| | | | | |
|---|---|---|---|---|
| 1,963,110 | A * | 6/1934 | Assael | 353/84 |
| 4,104,102 | A * | 8/1978 | Eagon et al. | 156/298 |
| 4,517,685 | A | 5/1985 | Lesley | |
| 4,769,265 | A * | 9/1988 | Coburn, Jr. | 428/40.4 |
| 5,017,770 | A * | 5/1991 | Sigalov | 250/221 |
| 5,235,416 | A * | 8/1993 | Stanhope | 348/77 |
| 5,423,554 | A | 6/1995 | Davis | |
| 5,594,469 | A | 1/1997 | Freeman et al. | |
| 5,616,078 | A | 4/1997 | Oh et al. | |
| 5,675,828 | A * | 10/1997 | Stoel et al. | 463/25 |
| 5,864,333 | A | 1/1999 | O'Heir et al. | |
| 5,982,352 | A * | 11/1999 | Pryor | 345/156 |
| 6,128,783 | A * | 10/2000 | Blauer et al. | 2/90 |
| 2002/0019258 | A1 | 2/2002 | Ahn et al. | |
| 2002/0036617 | A1 | 3/2002 | Pryor | |
| 2002/0083507 | A1 | 7/2002 | Mullis | |
| 2002/0097247 | A1 | 7/2002 | Ohba | |
| 2004/0017473 | A1 | 1/2004 | Marks | |

FOREIGN PATENT DOCUMENTS

JP 63186711 11/1988

(Continued)

OTHER PUBLICATIONS

Extended European Search Report from European Patent Application No. 10178921.2, dated May 27, 2011.

(Continued)

*Primary Examiner* — Peter DungBa Vo
*Assistant Examiner* — Jasson Yoo
(74) *Attorney, Agent, or Firm* — Banner & Witcoff, Ltd.

(57) ABSTRACT

Apparel is disclosed that can be worn to assist an interactive game in tracking the movement of the wearer. More particularly, the apparel may include one or more tracking marks formed of designs, patterns, or reflective materials that can be easily tracked by an interactive game employing one or more cameras or other detectors for detecting a change in position of an object. The apparel may take the form of, for example, hats, shirts, jackets, pants, gloves, and shoes. The apparel may use reflective materials, and the interactive game can employ a camera and a light source configuration where the camera is located within the observation angle of a player employing retroreflective materials reflecting light from the light source.

15 Claims, 4 Drawing Sheets

FOREIGN PATENT DOCUMENTS

WO 0031560 6/2000
WO 0171397 9/2001

OTHER PUBLICATIONS

Guskov, I., "Efficient Tracking of Regular Patterns on Non-rigid Geometry", University of Michigan, 2002:1057-1060.

Extended Search Report related in European Patent Application No. 10178921.2, dated May 27, 2011.

Extended Search Reported related in European Patent Application No. 10150066.8, dated May 31, 2011.

Exteneded European Search Report from European Patent Application No. 10150066.8, dated May 31, 2011.

Extended Search Report related in European Patent Application No. 09150346.6; dated Jan. 2, 2012.

* cited by examiner

INTERACTIVE GAMING APPAREL FOR INTERACTIVE GAMING

FIELD OF THE INVENTION

Aspects of the present invention relate to apparel for the type of interactive game employing one or more cameras or detectors to track the movement of a player. Other aspects of the present invention relate to an apparatus for implementing an interactive game employing one or more cameras or detectors to track the movement of a player.

BACKGROUND OF THE INVENTION

As computer games become more and more sophisticated, some players have sought to play computer games that are more interactive. That is, some players have sought to play computer games that do not respond to simple manipulation of controls on a control console, but instead respond directly to a user's movements, such as the position of the user's body or extremities. These games employ detectors, such as cameras, infrared receivers, ultrasound receivers and the like, to detect the position of the players or, in some cases, a player's extremities. The interactive computer game then provides the appropriate feedback in response to a player's movement. For example, the interactive computer game may simulate the position of a goalie in a soccer game. If the player moves quickly from left to right, then the interactive computer game may determine that the player has "blocked" a goal, and award the player points for blocking the goal. Thus, this type of interactive computer game allows a user to control the operation of the game by changing his or her position, making gestures, or otherwise moving his or her hands, arms, or legs.

This type of interactive game may employ a variety of different techniques to track a player's movements. As noted above, some games may use infrared or ultrasonic detectors to track the motion of the player. With these embodiments, the gaming device will have a sensor that transmits infrared or ultrasonic waves, and a receiver that receives the infrared or ultrasonic waves reflected from an object. The player will then typically don a reflective device that reflects the infrared or ultrasonic waves emitted by the gaming device back to its receiver.

With these types of interactive games, the player must put on a special device to assist the interactive game in tracking the player's movements. These devices may be cumbersome, and interfere with the natural feel of the game. Moreover, while some interactive games may allow multiple players to play simultaneously, in actuality the number of players may be limited by the number of tracking devices available.

SUMMARY OF THE INVENTION

Various embodiments of the present invention relate to apparel that can be worn to assist an interactive game in tracking the movement of the wearer. More particularly, some embodiments of the invention relate to apparel that includes one or more tracking marks formed of designs, patterns, or reflective materials that can be easily tracked by an interactive game employing one or more cameras or detectors for detecting a change in position of an object. The apparel according to various embodiments of the invention may take the form of, for example, hats, shirts, jackets, pants, gloves, and shoes. By providing tracking marks on apparel, rather than using a special-purpose device that must be separately worn by user, a player may enjoy a more natural feel when playing the interactive game. Further, the player need not don any special equipment to play the game. Instead, a user can wear the apparel for everyday purposes, and then simply begin playing the game wearing the apparel without having to put on any additional equipment.

Some embodiments of the invention also relate to the use of reflective materials and camera configurations that may be used by an interactive game in tracking the movement of a user. More particularly, some embodiments of the invention use one or more tracking markers formed with retroreflective material. Further, some of these embodiments of the invention use a camera and a light source configuration where the camera is located within the observation angle of a player employing retroreflective materials reflecting light from the light source.

These and other features and aspects of the invention will be apparent upon consideration of the following detailed description of the preferred embodiments.

BRIEF DESCRIPTION OF THE DRAWINGS

The foregoing summary of the invention, as well as the following detailed description of preferred embodiments, is better understood when read in conjunction with the accompanying drawings, which are included by way of example, and not by way of limitation with regard to the claimed invention.

DETAILED DESCRIPTION OF PREFERRED EMBODIMENTS

Apparel Bearing Tracking Marks

Figure 1:
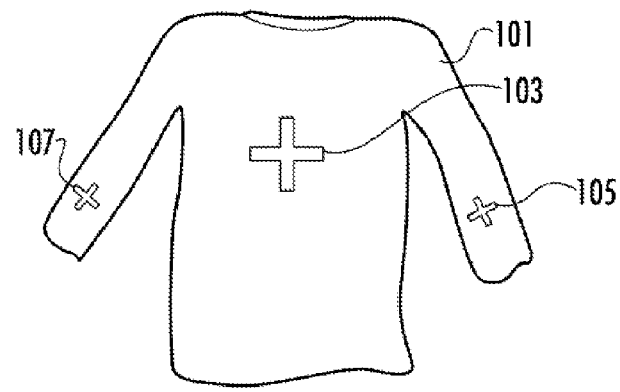
FIG. 1 illustrates apparel employing tracking marks according to one embodiment of the invention.

FIG. 1 illustrates one example of a piece of apparel employing tracking marks according to an embodiment of the invention. As seen in this figure, a shirt 101 includes a chest tracking mark 103, a left cuff tracking mark 105, and a right cuff tracking mark 107. Each of these tracking marks 103-107 has the appearance of a lightly-colored cross shape. Moreover, each tracking mark 103-107 faces toward the front of the shirt 101 (that is, toward the front of a user wearing the shirt 101), so that the tracking marks 103-107 will appear in images taken by one more cameras of an interactive game played by the wearer.

In the illustrated embodiment, the remainder of the shirt 101 other than the tracking marks 103-107 is relatively dark, providing for good contrast between the tracking marks 103-107 and the shirt 101 itself. For example, the tracking marks 103-107 may be bright white, while the remainder of the shirt 101 may be a dark blue, brown, or black. This high contrast between the tracking marks 103-107 and the background of the shirt 101 will assist an interactive game employing a camera to distinguish the tracking marks 103-107 from the background of the shirt 101. Moreover, the distinctive cross shape of the tracking marks 103-107 may assist a suitably-programmed interactive game to identify and distinguish these marks 103-107 from the background provided by the shirt 101. For example, the cross-shaped tracking marks 103-107 be useful with the interactive game is programmed to distinguish a cross shape from other shapes imaged by a camera or cameras.

As will be appreciated by those of ordinary skill in the art, the tracking marks 103-107 can be applied to the shirt 101 using a variety of techniques. For example, the tracking marks 103-107 may be stitched to the shirt 101, adhered to the shirt 101 using any suitable adhesive, or woven or knitted into the material of the shirt 101. Further, the tracking marks 103-107 can be printed onto the shirt 101 using a pad printing technique. The tracking marks 103-107 also can be heat transferred onto the shirt 101, dye-sublimated onto the shirt 101, or simply dyed into the material of the shirt 101. In addition, the tracking marks 103-107 can be glued onto the shirt 101, impregnated into the shirt 101 using, for example, thermoforming, or etched into the material of the shirt 101. Still further, the tracking marks 103-107 can be permanently mechanically attached to the shirt 101 using any suitable fastening mechanism, such as pins or staples. It should also be appreciated that, where desired, each tracking mark 103-107 can be applied to the shirt 101 using a different technique. For example, the chest tracking mark 103 may be stitched to the shirt 101, while the left cuff and right cuff tracking marks 105 and 107 may be silk screened onto the sleeves of the shirt 101.

Figure 2:
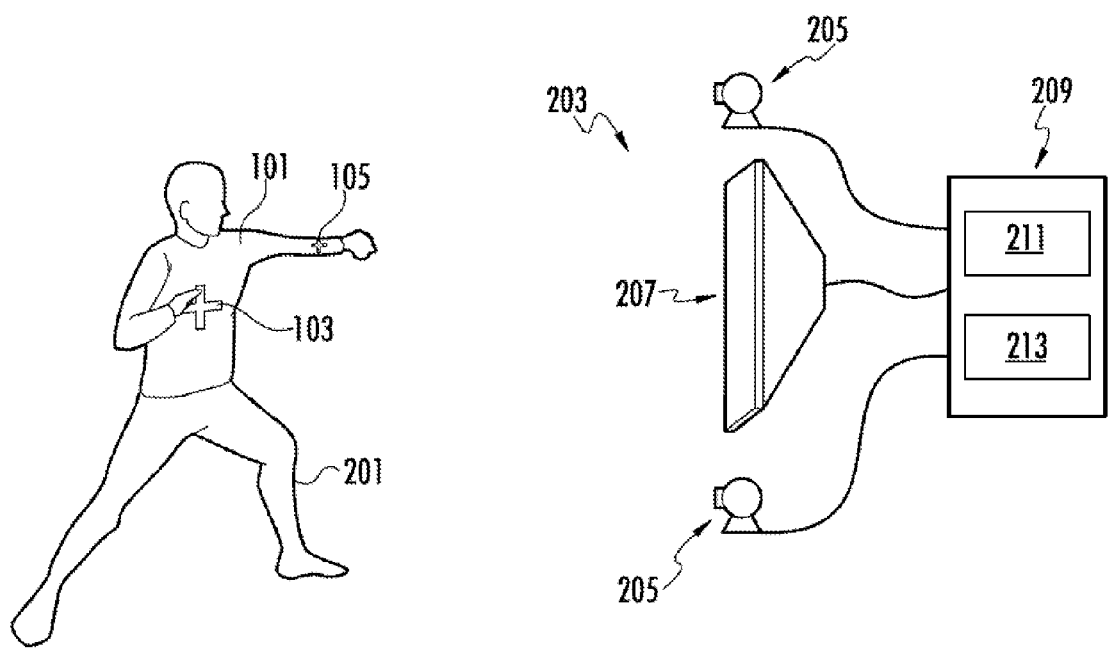
FIG. 2 illustrates the use of the apparel illustrated in FIG. 1 with an interactive computer game.

The use of the shirt 101 according to one embodiment of the invention is shown in FIG. 2. As seen in this figure, a player 201 dons the shirt 101, and stands before an interactive game 203. More particularly, the player 201 stands within the playing area defined for the interactive computer game 203. The interactive computer game 203 includes a pair of video cameras 205 and a display monitor 207. The interactive computer game 203 also includes a processing unit 209. The processing unit 209 has a tracking mark recognition module 211, and a game response module 213. The tracking mark recognition module 211 receives images from the cameras 205. From these images, the tracking mark recognition module 211 recognizes one or more tracking marks in the visual fields of the cameras 205, and determines the movement, if any, of the recognized tracking marks.

For example, the tracking mark recognition module 211 may employ an algorithm to recognize a tracking mark by distinguishing pixels having a particular color in an image obtained by a camera 205 from pixels in that image of other colors. Alternately, the tracking mark recognition module 211 may recognize a tracking mark by distinguishing the brightness of pixels of the tracking mark from the other pixels in an image obtained by the camera 205. Still further, the recognition module 211 may recognize a tracking mark by distinguishing pixels of a relatively uniform brightness, shade, or color that are arranged in a particular shape.

Once the tracking mark recognition module 211 recognizes one or more tracking marks, it then determines the movement of the recognized tracking marks. Algorithms for determining the movement of recognized images are well known in the art, and will not be discussed here in detail. For example, the tracking mark recognition module 211 may use the "city block" method of determining the three-dimensional position of an imaged tracking mark by comparing the position of a specific location on the mark in the image from one camera 205 with the position of the same location on the tracking mark in a simultaneous image from another camera 205, for the entire area of the tracking mark.

With some embodiments of the invention, the tracking mark recognition module 211 may additionally determine movement of the user's extremities from the detected movement of the tracking marks. For example, using inverse kinematics, the tracking mark recognition module 211 may determine that a user has moved his or her right forearm based upon the detected rotation of one tracking mark (located at the user's wrist) about another stationary tracking mark (located at the user's elbow). The use of reverse kinematics is also well known in the art, and thus will not be described here in detail.

Based upon the detected movement of the tracking marks, the game response module 213 then provides a corresponding response on the monitor 207. For example, if the objective of the game is for the player to position himself or herself so as to block a virtual soccer ball from entering a virtual goal, then the game response module 213 will determine if the movement of any of the tracking marks 103-107 will place that tracking mark between the virtual soccer ball and the virtual goal. If the game response module 213 determines that one of the tracking marks 103-107 has moved to a virtual location between the virtual soccer ball and the virtual goal, then the game response module 213 may display a soccer ball moving away from the player 201, indicating that the player has successfully blocked the ball. On the other hand, if the game response module 213 determines that the movement of the tracking marks 103-107 does not place a tracking mark between the virtual soccer ball and the virtual goal, then the game response module 213 may display a scoring indicator indicating that the player 201 has given up a point in a virtual soccer game.

It should be noted that, with various embodiments of the invention, the tracking mark recognition module 211 may additionally or alternately-recognize qualitative information from one or more of the tracking marks. Thus, a user may wear apparel that displays a special tracking mark, such as a specific number or pattern. Upon recognizing this number of pattern, the tracking mark recognition module 211 may then provide the game with one or more special features of functions.

For example, if the interactive game 203 is a virtual soccer goal-blocking game, the user may wear a shirt bearing the number of a soccer player that is particularly good at blocking high shots on the goal. When the tracking mark recognition module 211 recognizes the number, the game 203 may then relax the user's requirements for successfully blocking a "high" virtual shot on the virtual goal. Alternately, if the interactive game 203 provides a training program to assist a user in exercising with handheld or strapped-on weight, the tracking mark recognition module 211 may recognize the mass of the weight from its color, and the game 203 will then adjust the training program accordingly. With some of these embodiments, the interactive game 203 may use the tracking marks only to obtain qualitative information. The game 203 may then determine the user's position or movements using techniques other than with the tracking marks, such as by conventional infrared, visible light or sonic positioning and motion detection.

In addition to passively providing qualitative information, the tracking marks may also provide qualitative information when moved. For example, the tracking mark recognition module 211 may recognize particular movements or motions of one or more tracking marks as character information or instructional information. Thus, with some embodiments of the invention, a user may make a particular motion with one or more tracking marks, and the tracking mark recognition module will recognize these motions to be an instruction to, e.g., turn off the game, change the type or characteristics of the game, input alphanumeric information, or provide other qualitative information.

Figure 3:
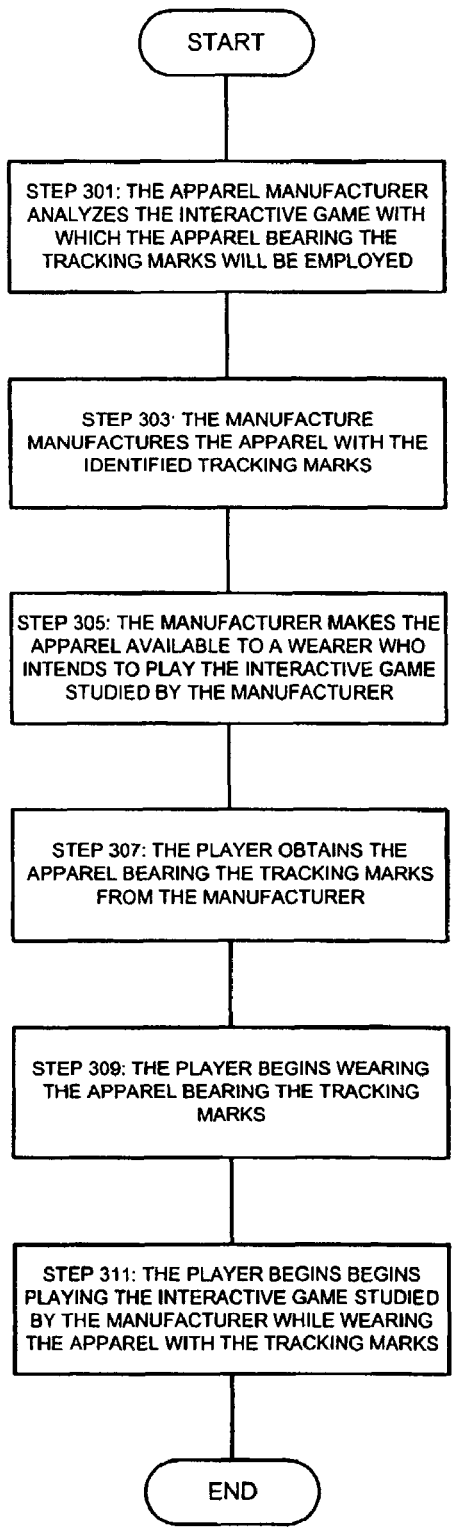
FIG. 3 is a graphic illustration of the operation of retroreflectivity.

The method of manufacturing apparel bearing tracking marks, such as the shirt 101, according to various embodiments of the invention is illustrated in FIG. 3. As seen in this figure, in step 301, the apparel manufacturer analyzes the interactive game 203 with which the apparel bearing the tracking marks will be employed. More particularly, the apparel manufacturer determines the type of tracking mark or marks that the apparel should have in order to allow the interactive game 203 to properly track the user's movements. This information regarding the types of suitable tracking marks may be obtained directly from the manufacture of the interactive game 203, or it may be obtained by studying the components of the interactive game 203, such as the software code of the interactive game 203 (for example, the software code of the tracking mark recognition module 211).

For example, as illustrated in FIG. 1, the shirt 101 bears specific shapes (that is, cross shapes) that the interactive game 203 can easily identify as tracking marks. With alternate embodiments of the invention, however, the interactive game may distinguish tracking marks of specific colors rather than specific shapes. For example, with some embodiments of the invention, the interactive game may more easily identify a tracking mark having the color red from a blue background of the apparel than a tracking mark having a particular shape. Alternately, or additionally, some interactive games may better distinguish reflective tracking marks than tracking marks that simply have a high contrast with respect to the apparel on which they are placed. For example, with some embodiments of the invention, the interactive game may employ an electromagnetic wave transmitter, such as an infrared, visible light or sonic transmitter, together with one or more detectors for detecting the reflection of these electromagnetic waves. The tracking marks can then be formed of a material that is particularly reflective of the appropriate type of electromagnetic wave.

Further, some interactive games may track only the player's position. With these games, the piece of apparel might require only a single tracking mark located in a central position on the apparel. Moreover, the interactive game may actually track the movement of each of the player's extremities. With this type of interactive game, the apparel might require multiple tracking marks, such as one on each sleeve of a shirt, or on each leg of a pair of pants.

After the manufacturer has determined the appropriate tracking mark or marks to be applied to the apparel, the manufacture manufactures the apparel with those tracking marks in step 303. As discussed in detail above, the manufacturer can manufacture the apparel to inherently include the tracking marks, or the manufacturer may apply the tracking marks to the apparel after the apparel is created. Next, in step 305, the manufacturer makes the apparel available to a wearer who intends to play the interactive game studied by the manufacturer. Then, in step 307, the player 201 obtains the apparel bearing the tracking marks from the manufacturer. In step 309, the player 201 begins wearing the apparel bearing the tracking marks, and, in step 311, begins playing the interactive game studied by the manufacturer while wearing the apparel with the tracking marks.

As discussed above, the apparel employing the tracking marks may be of any desired type. For example, with some embodiments of the invention, the apparel can include shirts, such as long sleeve shirts and sleeve shirts, jackets, pants, shorts, socks, and hat. The apparel can also include footwear. Still further, the apparel may be a hand-held object, such as a weight or piece of sports equipment, a band, such as a band that may be worn around the player's wrist, chest or ankles, or a sticker that may be applied to apparel that the player already possesses.

Retroreflective Tracking Marks

Figure 4:
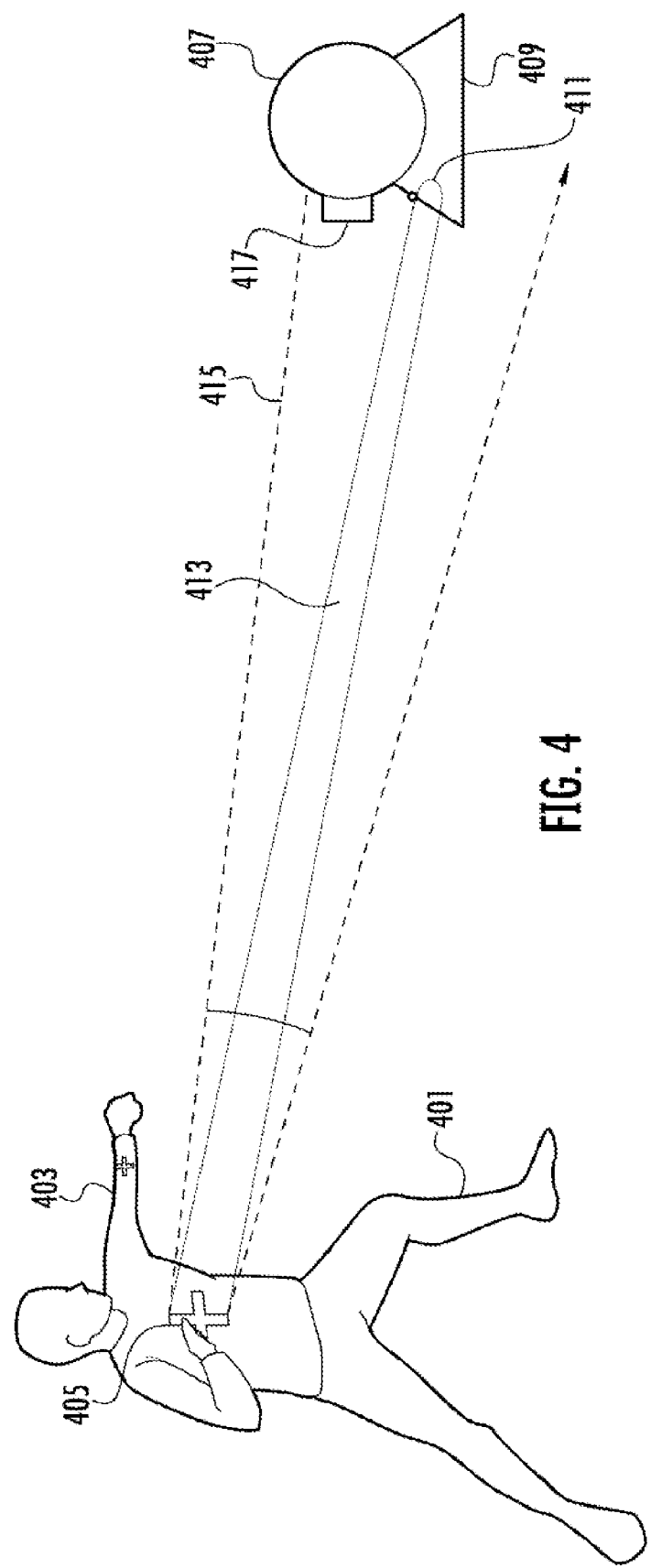
FIG. 4 illustrates a camera for use with an interactive computer game according to embodiments of the invention.

FIG. 4 illustrates yet another embodiment of the invention, which employs one or more retroreflective tracking marks to assist an interactive game in tracking the movements of a player. As seen in this figure, the player 401 is wearing a shirt 403 that bears a chest tracking mark 405. The tracking mark 405 is formed of retroreflective material. As is known in the art, retroreflective material is a material that reflects light back in the direction of its source.

Figure 5:
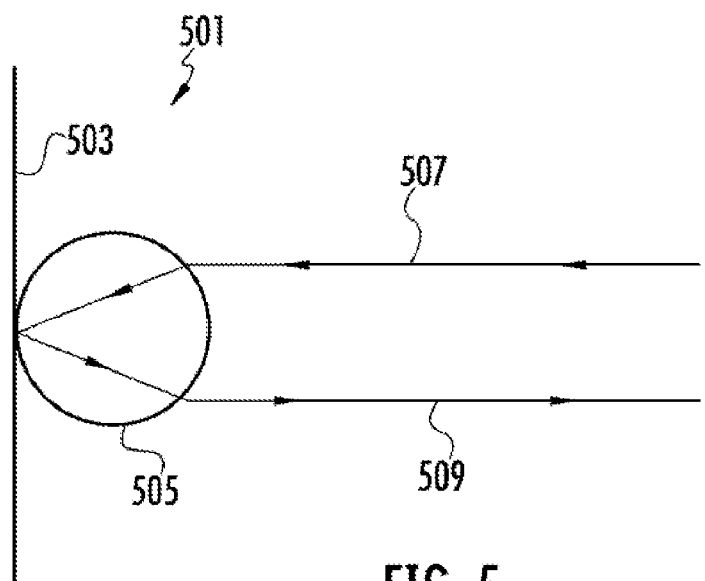
FIG. 5 illustrates one example of retroreflective material that may be used with embodiments of the invention.

More particularly, the operation of retroreflectivity will be discussed briefly with reference to FIG. 5. As will be appreciated by those of ordinary skill in the art, materials typically will reflect in one of two ways. First, a surface may diffusely reflect incident light. That is, if incident light strikes a diffusive surface at a particular angle, the surface will reflect that incident light in multiple directions, and not produce a clear reflection of the incident light. Second a surface may provide a specular or mirror reflection. With this type of surface, if incident light strikes the surface at a particular angle, the surface will reflect the incident light at the opposite angle. With retroreflective surfaces, however, the incident light is reflected in generally the same direction from which it originated.

As known in the art, a retroreflective surface includes a mirrored layer 503 and a retroreflective sheeting layer over the mirrored player 503. The retroreflective sheeting layer may be formed of tiny cube or prism elements, or it may be formed of transparent beads, such as the sphere 505 shown in FIG. 5. As seen in this figure, when an incident light ray 507 strikes the bead 505, it is reflected toward the center axis (perpendicular to the mirrored layer 503) of the bead 505. When the incident light ray 507 is then reflected from the mirrored surface 503, it exits the bead 505 in a direction generally parallel to that of the incident light ray 507. Thus, retroreflective surfaces will reflect incident light in generally the same direction from which it originated. Of course, there will be some deviation between the direction of the incident light ray and its corresponding reflected light ray. This deviation is referred to as the observation angle.

Returning now to FIG. 4, the interactive game being used by the player 401 employs a camera 407 to take advantage of the retroreflectivity of the tracking mark 405. The camera 407 includes a stand 409 having a light source 411 mounted thereon. When a beam of incident light 413 is directed from the light source 411, the tracking mark 405 reflects the incident light 413 in a beam of reflected light 415. The direction of the reflected light beam 415 is back toward the light source 411. Because the camera lens 417 is relatively close to the light source 411, it is within the observation angle for light reflected from the light source 411.

Thus, the camera lens 417 will image the light from the light source 411 reflected by the retroreflective tracking mark 405. As will be appreciated by those of ordinary skill in the art, however, other observers standing outside of the observation angle will not view the reflected light 415 from the retroreflective tracking mark 405. Instead, to these observers, the tracking mark 405 will simply appear as a somewhat shiny mark. Moreover, because of the high reflectivity of the retroreflective tracking mark 405, the image of the tracking mark 405 will be strongly distinguished from its surrounding background, such as the background provided by the shirt 403. This will assist the interactive computer game in recognizing the tracking mark 405 from its background.

Of course, it will be appreciated that the light source 411 need not be mounted on the stand 409 of the camera 407 in order for the camera 407 to be within the observation angle for light reflected from the light source 411. Instead, as will be apparent to those of ordinary skill in the art, the area encompassed by the observation angle for light reflected from the retroreflective tracking mark 405 will depend upon the distance from the light source 411 to the tracking mark 405. Whether or not the camera 407 will be within the area encompassed by the observation angle will also depend upon the distance of the camera 407 to the retroreflective tracking mark 405.

Figure 6:
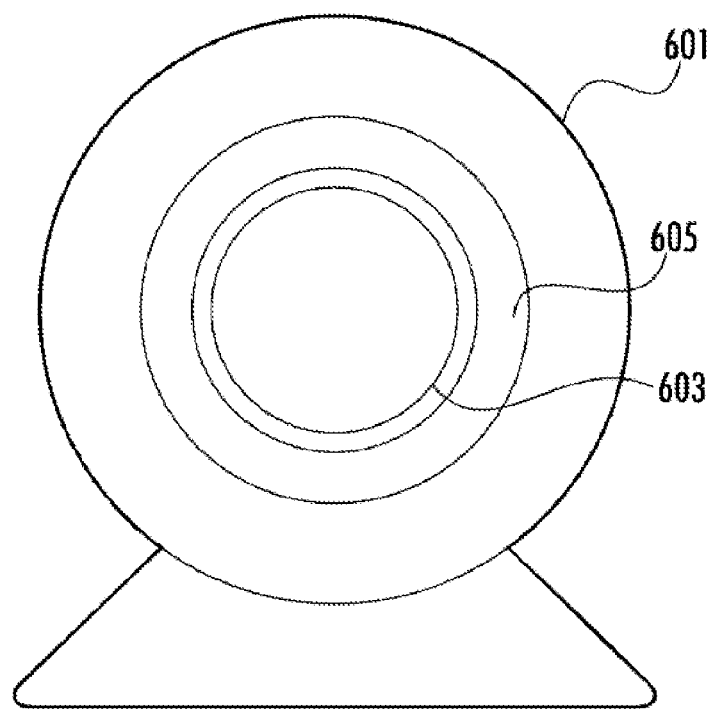
FIG. 6 illustrates another camera for use with an interactive computer game according to embodiments of the invention.

FIG. 6 illustrates one embodiment of a camera 601 that typically ensures that the images obtained by the camera 601 will include light from within the observation angle of light reflected from a retroreflective tracking mark. The camera 601 includes a camera lens 603 and a light source 605. As seen in FIG. 6, the light source 605 encircles the lens 603. Thus, any light from the light source 605 will be retroreflected back to the camera lens 603. That is, in almost all situations, the camera lens 603 will be within the observation angle of light reflected from the light source 605. Of course, as will be appreciated by those of ordinary skill in the art, the radial distance between the lens 603 and the light source 605 can be modified based upon the expected distance to the retroreflective tracking mark. In most situations, the interactive computer game will typically specify a depth of a playing area. Thus, the intended depth of the playing area can be taken into account when spacing the light source 605 from the lens 603.

It should be noted that, in addition to the light source/lens configurations shown in FIGS. 4 and 6, a variety of other configurations are also possible. For example, the light source 605 may only partially encircle the camera lens 603. Alternately, the light source 605 may be mounted with a different support than the mount for the camera. A wide variety of positioning and mounting options are separately available for the light source 605 and the camera lens 603 that will still maintain the camera lens 603 within the observation angle for light reflected by a retroreflective target from the light source 605.

CONCLUSION

Although the invention has been defined using the appended claims, these claims are exemplary in that the invention may be intended to include the elements and steps described herein in any combination or sub combination. Accordingly, there are any number of alternative combinations for defining the invention, which incorporate one or more elements from the specification, including the description, claims, and drawings, in various combinations or sub combinations. It will be apparent to those skilled in the relevant technology, in light of the present specification, that alternate combinations of aspects of the invention, either alone or in combination with one or more elements or steps defined herein, may be utilized as modifications or alterations of the invention or as part of the invention. It may be intended that the written description of the invention contained herein covers all such modifications and alterations. For instance, in various embodiments, a certain order to the data has been shown. However, any reordering of the data is encompassed by the present invention. Also, where certain units of properties such as size (e.g., in bytes or bits) are used, any other units are also envisioned.

We claim:

1. A method of playing an interactive computer game, comprising:

donning an article of wear, the article of wear substantially permanently displaying one or more tracking marks that can be recognized by the interactive game, wherein at least one of the one or more tracking marks is knitted or woven into a material from which the article of wear is produced;

playing the interactive game by wearing the article of wear so that the interactive game recognizes at least one of the one or more tracking marks displayed by the article of wear;

wherein at least one of the one or more tracking marks conveys qualitative information to the interactive computer game as a result of motion of at least one of the one or more tracking marks;

wherein the qualitative information is interpreted by the interactive computer game as instruction; and wherein the instruction includes a member selected from the group of: an instruction to turn off the game, an instruction to change a type or characteristic of the game, and an instruction to input alphanumeric information.

2. The method of playing an interactive computer game recited in claim 1, wherein playing the interactive game includes moving toward or away from the interactive computer game, such that the interactive computer game can determine the movement toward or away from the interactive computer game by recognizing a change in position of at least one of the one or more tracking marks.

3. The method of playing an interactive computer game recited in claim 1, wherein playing the interactive game includes moving an extremity of the article of wear displaying at least one of the one or more tracking marks, such that the interactive computer game can determine the movement of the extremity by recognizing a change in position of at least one of the one or more tracking marks.

4. The method of playing an interactive computer game recited in claim 1, wherein playing the interactive game includes:

displaying at least one of the one or more tracking marks that is associated with qualitative information, and employing an aspect of the game that is changed in response to recognition of the qualitative information from the at least one of the one or more tracking marks.

5. The method of playing an interactive computer game recited in claim 1, wherein the article of wear is selected from the group consisting of: footwear, a shirt, pants, a jacket, shorts, socks, a hat, and a band.

6. The method of playing an interactive computer game recited in claim 1, wherein the at least one of the one or more tracking marks has a color that can be recognized by the interactive game.

7. The method of playing an interactive computer game recited in claim 1, wherein the at least one of the one or more tracking marks has a shape that can be recognized by the interactive game.

8. The method of playing an interactive computer game recited in claim 1, wherein the at least one of the one or more tracking marks has a reflectivity that can be recognized by the interactive game.

9. A method of providing an interactive gaming experience, comprising:

recognizing a position of a tracking mark at a first location, wherein the tracking mark is substantially permanently displayed on an article of wear by weaving or knitting the tracking mark into a material from which the article of wear is produced;

recognizing a position of the tracking mark substantially permanently displayed on the article of wear at a second location;

displaying a game action in response to a change in position of the tracking mark from the first location to the second location;

wherein the change in position of the tracking mark is associated with qualitative information, and wherein an aspect of the interactive gaming experience is changed in response to recognition of the qualitative information;

wherein the qualitative information is interpreted by the interactive computer game as an instruction; and wherein the instruction includes a member selected from the group of: an instruction to turn off the game, an instruction to change a type or characteristic of the game, and an instruction to input alphanumeric information.

10. The method of providing an interactive gaming experience recited in claim 9, further including recognizing a position of the tracking mark by distinguishing a color of the tracking mark from one or more colors of the article of wear.

11. The method of providing an interactive gaming experience recited in claim 9, further including recognizing a position of the tracking mark by distinguishing a shape of the tracking mark.

12. The method of providing an interactive gaming experience recited in claim 9, further including recognizing a position of the tracking mark by distinguishing a reflectivity of the tracking mark from a reflectivity of the article of wear.

13. The method of providing an interactive gaming experience recited in claim 9, wherein the article of wear is selected from the group consisting of: footwear, a shirt, pants, a jacket, shorts, socks, a hat, and a band.

14. The method of providing an interactive gaming experience recited in claim 9, further comprising:

recognizing qualitative information from the tracking mark, and changing an aspect of the game in response to recognizing the qualitative information from the tracking mark.

15. The piece of apparel for use with an interactive computer game, comprising:

an article of wear; and at least one tracking mark substantially permanently displayed on the article of wear, the at least one tracking mark being formed of a retroreflective material, wherein the retroreflective material is overlaid with a translucent colored film, the at least one tracking mark being positioned so as to be recognizable by an interactive computer game.

\* \* \* \* \*